United States Patent [19]
Barsotti et al.

[11] Patent Number: 5,763,528
[45] Date of Patent: Jun. 9, 1998

[54] COATING COMPOSITIONS CONTAINING NON-AQUEOUS DISPERSED POLYMERS HAVING A HIGH GLASS TRANSITION TEMPERATURE

[75] Inventors: Robert John Barsotti, Franklinville, Pa.; Laura Ann Lewin, Greenville; Christopher Scopazzi, Wilmington, both of Del.

[73] Assignee: E. I. du Pont de Nemours and Company, Wilmington, Del.

[21] Appl. No.: 767,919

[22] Filed: Dec. 17, 1996

[51] Int. Cl.$^6$ .................................................. C08G 18/63
[52] U.S. Cl. ........................ 525/63; 525/66; 525/69; 525/123; 428/423.1
[58] Field of Search ........................ 525/63, 66, 69, 525/123; 428/423.1

[56] References Cited

U.S. PATENT DOCUMENTS

| | | | |
|---|---|---|---|
| 4,424,334 | 1/1984 | Chattha | 528/77 |
| 4,529,787 | 7/1985 | Schmidt et al. | 526/317 |
| 4,546,160 | 10/1985 | Brand et al. | 526/320 |
| 4,713,427 | 12/1987 | Chattha et al. | 525/510 |
| 4,746,714 | 5/1988 | Spinelli et al. | 525/286 |
| 4,804,732 | 2/1989 | Ryntz et al. | 528/28 |
| 5,010,140 | 4/1991 | Antonelli et al. | 525/269 |
| 5,015,688 | 5/1991 | Bederke et al. | 524/600 |
| 5,066,698 | 11/1991 | Hazan et al. | 524/269 |
| 5,098,952 | 3/1992 | Blasko et al. | 525/123 |
| 5,098,956 | 3/1992 | Blasko et al. | 525/123 |
| 5,173,533 | 12/1992 | Yabuta et al. | 524/523 |
| 5,206,295 | 4/1993 | Harper et al. | 525/207 |
| 5,266,406 | 11/1993 | Hartog et al. | 428/423.1 |
| 5,286,782 | 2/1994 | Lamb et al. | 524/507 |
| 5,331,025 | 7/1994 | Lavoie et al. | 523/437 |
| 5,346,958 | 9/1994 | Yukawa et al. | 525/124 |
| 5,356,973 | 10/1994 | Taljan et al. | 524/314 |
| 5,362,826 | 11/1994 | Berge et al. | 526/194 |
| 5,491,192 | 2/1996 | Walker et al. | 525/7.4 |

FOREIGN PATENT DOCUMENTS

| | | |
|---|---|---|
| 398987-A | 11/1990 | European Pat. Off. |
| 408858-A | 1/1991 | European Pat. Off. |
| 0661630 A1 | 12/1994 | European Pat. Off. |
| 227971-A | 10/1985 | German Dem. Rep. |
| 0413070-A | 5/1992 | Japan |
| 07118605-A | 5/1995 | Japan |
| 07133436-A | 5/1995 | Japan |

OTHER PUBLICATIONS

Nakamichi T, Shibato K. Acrylic; Hexamethoxymethylmelamine. *Jap. Soc. Col. Mat.*, 59, 592–9, 1986; Oct.

Li Bassi G, Cadona L, Broggi F, Advance in low–odour coatings: A New Class of Polymeric Non–Yellowing Photoinitiators. *Proc. Radcure Europe*, 3.15–3.36, Munich 1987.

Steven G. J., Investigation in to the performance properties of a number of different urethane acrylate oligomer types. *Proc. Radtech Europe*, 729–41, Florence 1989.

*Primary Examiner*—Rachel Gorr
*Attorney, Agent, or Firm*—Hilmar L. Fricke

[57] ABSTRACT

A coating composition of a film forming binder and an organic liquid carrier; wherein the binder contains about (a) 10–90% by weight, based on the weight of the binder, of a dispersed gelled acrylic polymer having a glass transition temperature of at least 20° and the polymer has (i) a core of comprising polymerized ethylenically unsaturated monomers which is not soluble in the organic liquid carrier and having chemically grafted thereto (ii) substantially linear stablizier polymeric components that are soluble in the organic liquid carrier and comprise polymerized ethylencially unsaturated monomers and have a weight average molecular weight of about 500–20.000 determined by GPC;

wherein the monomers of the core and the stabilizer polymeric components are individually selected from the following group of monomers: alkyl methacrylates, alkyl acrylates, wherein the alkyl groups have 1–12 carbon atoms, hydroxy alkyl methacrylate, hydroxy alkyl acrylates, wherein the alkyl groups have 1–4 carbons atoms, styrene, alpha methyl styrene, vinyl toluene, glycidyl methacrylate, glycidyl acrylate, alpha-beta ethylenically unsaturated monocarboxylic acids and any mixtures thereof and the core, stabilizer polymeric component or both contain at least 3% by weight of polymerized ethylenically unsaturated monomers having functional components that are capable of reacting with components (b) and/or (c);

(b) 0–70% by weight, based on the weight of the binder, of an oligomer having functional groups capable of reacting with component (c); and (c) 10–50% by weight, based on the weight of the binder, of an organic polyisocyanate crosslinking agent.

12 Claims, No Drawings

COATING COMPOSITIONS CONTAINING NON-AQUEOUS DISPERSED POLYMERS HAVING A HIGH GLASS TRANSITION TEMPERATURE

TECHNICAL FIELD

This invention relates to high solids solvent based coating compositions having a low VOC (volatile organic content) and in particular to a clear coating composition useful for refinishing clear coat/color coat finishes of automobiles.

BACKGROUND OF THE INVENTION

Solvent based coating compositions useful as clear coats and refinishing clear coats composed of an acrylic polymer, a polyol and an organic polyisocyanate crosslinking agent that provide coatings of excellent quality are known in the art as shown in Lamb et al U.S. Pat. No. 5,286,782 issued Feb. 15, 1994. A dispersion of a first high molecular weight polymer having chemically reactive groups in an organic liquid and a second high molecular weight polymer having chemically reactive groups that are capable of reacting with the reactive groups of the first polymer and form useful coating compositions are disclosed in Yabuta et al U.S. Pat. No. 5,173,533 issued Dec. 22, 1992. Polyol blends of high and low Tg (glass transition temperature) polymers that are used to form coating compositions are shown in U.S. Pat. Nos. 5,098,956 and 5,098,952 both issued to Blasko et al on Mar. 24, 1992. There is a need for a low VOC coating composition that meets pollution regulations for the refinishing of automobiles and trucks that cures rapidly to a tack free coating and that can be later buffed to a high gloss finish. Such a combination of properties is not provided by the aforementioned prior art coatings.

SUMMARY OF THE INVENTION

A coating composition containing about 40–90% by weight of film forming binder and 10–60% by weight of an organic liquid carrier; wherein the binder contains about (a) 10–90% by weight, based on the weight of the binder, of a dispersed gelled acrylic polymer having a glass transition temperature of at least 20° C. and having
   (i) a core of gelled polymerized ethylenically unsaturated monomers which is not soluble in the organic liquid carrier and having chemically grafted thereto
   (ii) substantially linear stabilizer polymeric components that are soluble in the organic liquid carrier and comprise polymerized ethylencially unsaturated monomers and have a weight average molecular weight of about 500–20,000 determined by GPC (gel permeation chromatography) using polystyrene as the standard;
      wherein the monomers of the core and the stabilizer polymeric components are individually selected from the following group of monomers of alkyl methacrylates, alkyl acrylates, wherein the alkyl groups have 1–12 carbon atoms, hydroxy alkyl methacrylate, hydroxy alkyl acrylates, wherein the alkyl groups have 1–4 carbons atoms, styrene, glycidyl methacrylate, glycidyl acrylate, alpha-beta ethylenically unsaturated monocarboxylic acids and any mixtures thereof and the core, stabilizer polymeric component or both contain at least 3% by weight of polymerized ethylenically unsaturated monomers having functional components that are capable of reacting with components (b) and/or (c);

(b) 0–70% by weight, based on the weight of the binder, of an oligomer having functional components capable of reacting with component (c); and (c) 10–500% by weight, based on the weight of the binder, of an organic polyisocyanate crosslinking agent.

DETAILED DESCRIPTION OF THE INVENTION

In repairing a clear coat/color coat finish of an automobile or truck, generally the color coat is applied and dried for a short time but not cured and then the clear coat is applied and both coats are cured. If necessary, the cured clear coat is buffed to improve appearance and remove minor imperfections. The coating composition of this invention has a short drying time and thereby improves the rate of processing vehicles through a typical repair facility. In particular, the novel composition has a short tack and dust free time when used as a clear finish so that the vehicle can be moved out of the work area to provide room for another vehicle to be painted. The novel composition when used as a clear finish is buffable in a short period of time after application and initially drying and remains buffable for several days, preferably up to one week before it cures into a hard durable finish. For a finish to be buffable it must be hard but not tough.

Preferably, the coating composition of this invention when used as a clear coat dries to tack free state in about two hours of application.

The novel coating composition is solvent based and contains about 10–60% by weight of an organic liquid carrier and correspondingly, about 90–40% by weight of film forming binder and preferably has a VOC of about 3.5–4.5 pounds of solvent per gallon of coating composition. The binder contains about 10–90% by weight of a dispersed gelled acrylic polymer, about 0–70% by weight of an oligomer both having functional components that are reactive with the polyisocyanate crosslinking agent which comprises about 10–50% by weight of the binder. Useful oligomers have a weight average molecular weight of about 200–2,000 and a polydispersity of less than 1.7 and have functional components capable of reacting with the organic polyisocyanate crosslinking agent and optionally with the dispersed gelled acrylic polymer.

Generally, the novel coating composition is used as a clear coat but can be pigmented with conventional pigments and used as a monocoat or as basecoat.

The dispersed gelled acrylic polymer used to formulate the coating composition of this invention is prepared from a macromonomer which forms the linear stabilizer polymeric components that are chemically grafted to a core.

Preferably, the polymer contains about 30–70% by weight of the core and 70–30% by weight of substantially linear stabilizer polymeric components having a glass transition temperature of about 20°–80° C. These linear stabilizer components are soluble in the organic carrier liquid used to form the coating composition and keeps the acrylic polymer dispersed in the liquid while the core is insoluble in this liquid. These macromonomers which form the polymeric components of the polymer comprises polymerized alpha-beta ethylenically unsaturated monomers and have one terminal ethylenically unsaturated moiety and have a weight average molecular weight (MW) of 500–20,000, preferably 1,000 to 10,000. About 25–75% (by weight), preferably 40–60%, of the macromonomer is copolymerized with 75–25%, preferably 60–40%, of a blend of other alpha, beta-ethylenically unsaturated monomers which form the core of the acrylic polymer. At least 3%, preferably 3–30% by weight, of the monomers have functional groups in the stabilizer or the core or in both having functional components that are capable of reacting with the polyisocyanate crosslinking agent.

The Tg (glass transition temperatures) of the acrylic polymer is calculated and has a Tg of at least 20° C. and preferably 20°-80° C. The Tg is calculated by the equation:

$$\frac{1}{TGC} = \sum_i \frac{W_i}{TGC_i}$$

where

TGC- is the glass transition temperature of the polymer in degrees Kelvin;

$W_i$ is the weight fraction of monomer i in the polymer;

TGChd iis the glass transition temperature of the homopolymer i in degrees Kelvin of monomer i which can be found for example in a source book such as the *Polymer Handbook* by J. Brandrup and E. H. Immergut and published by John Wiley & Sons.

The above equation is discussed on page 20 in *The Chemistry of Organic Film Formers*, 2nd edition, by D. H. Solomon and published by Robert E. Krieger Publishing Co.

The dispersed gelled acrylic polymer may be prepared by polymerizing ethylenically unsaturated monomers that comprise the insoluble core in the presence of macromonomers, each macromonomer having at least one ethylenic unsaturation component. The acrylic polymer can be envisioned as being composed of a core having a plurality of macromonomer stabilizer components attached thereto. In the present composition, both the macromonomer stabilizer components and the core may have reactive functionality capable of reacting with a crosslinking agent, although it is optional to have such reactive functionality only or essentially only or substantially only on the stabilizer components.

It is to be understood that the core or macromonomers referred to as having functionality may be part of a mixture of macromonomers of which a portion do not have any functionality or variable amounts of functionality. It is also understood that, in preparing any core or macromonomers, there is a normal distribution of functionality.

Macromonomers can be prepared by conventional techniques as shown in Hazan et al U.S. Pat. No. 5,066,698 issued Nov. 19, 1991 (see Example 1) using conventional catalysts.

In a preferred method a catalytic chain transfer agent is used to ensure that the resulting macromonomer only has one terminal ethylenically unsaturated group which will polymerize with the core monomers to form the acrylic polymer. Typically, in the first step of the process for preparing the macromonomer, the monomers are blended with an inert organic solvent and a cobalt chain transfer agent and heated usually to the reflux temperature of the reaction mixture. In subsequent steps additional monomers and cobalt catalyst and conventional polymerization catalyst are added and polymerization is continued until a macromonomer is formed of the desired molecular weight.

Preferred cobalt chain transfer agents or catalysts are described in U.S. Pat. No. 4,680,352 to Janowicz et al and U.S. Pat. No. 4,722,984 to Janowicz. Most preferred are pentacyanocobaltate (II), diaquabis(borondifluorodimethylglyoximato) cobaltate(11) and diaquabis (borondifluorophenylglyoximato) cobaltate (II). Cobalt (III) versions of these catalysts are also preferred. Typically these chain transfer agents are used at concentrations of about 5–1000 ppm based on the monomers used.

The macromonomer is preferably formed in a solvent or solvent blend using a free radical initiator and a Co (II) or (III) chelate chain transfer agent.

Examples of solvents are aromatics, aliphatics, ketones, glycol ethers, acetates, alcohols as, e.g., methyl ethyl ketone, isopropyl alcohol, n-butyl glycol ether, n-butyl diethylene glycol ether, propylene glycol methyl ether acetate, propylene glycol methyl ether, and N-butanol.

Peroxy- and azo-initiators (0.5–5% weight on monomer) can be used in the synthesis of the macromonomers in the presence of 2–5,000 ppm (on total monomer) or Co (II) chelate in the temperature range between 70°–160° C., more preferably azo-type initiators as, e.g., 2,2'-azobis (2,4 dimethylpentane nitrile), 2,2'-azobis (2-methylpropane nitrile), 2,2'-azobis (2-methylbutane nitrile), 1,1'-azo (cyclohexane carbonitrile) and 4,4'-azobis (4-cyanopentanoic) acid.

After the macromonomer is formed as described above, solvent is optionally stripped off and the core monomers are added to the macromonomer along with additional solvent and polymerization catalyst. Any of the aforementioned azo-type catalysts can be used as can other suitable catalysts such as peroxides and hydroperoxides. Typical of such catalysts are di-tertiarybutyl peroxide, dicumylperoxide, tertiaryamyl peroxide, cumenehydroperoxide, di(n-propyl) peroxydicarbonate, peresters such as amyl peroxyacetate and the like. Commercially available peroxy type initiators include, e.g., t-butylperoxide or Triganox® B from AKZO, t-butylperacetate or Triganox® FC50 from AKZO, t-butylperbenzoate or Triganox® C from AKZO, and t-butylperpivalate or Triganox® 25 C-75 from AKZO.

Polymerization is continued at or below the reflux temperature of the reaction mixture until the acrylic polymer is formed of the desired molecular weight.

During the polymerization or afterward, non-solvent(s) for the core are added to form low viscosity sprayable polymer dispersion rather than a polymer solution having a relatively high viscosity which would require further dilution with solvents for spraying thereby increasing the VOC content of the composition.

Typical solvents that can be used to form the macromonomer or the acrylic polymer are ketones such as methyl ethyl ketone, isobutyl ketone, ethyl amyl ketone, acetone, alcohols such as methanol, ethanol, isopropanol, esters such as ethyl acetate, glycols such as ethylene glycol, propylene glycol, ethers such as tetrahydrofuran, ethylene glycol mono butyl ether and the like.

Typical monomers that can be used to form the core or the macromonomers are for example (but not limited to), acrylic and methacrylic acid esters of straight-chain or branched monoalcohols of 1 to 20 carbon atoms. Preferred esters are alkyl acrylates and methacrylates having 1–12 carbons in the alkyl group such as methyl acrylate, ethyl acrylate, propyl acrylate, isopropyl acrylate, butyl acrylate, pentyl acrylate, hexyl acrylate, 2-ethyl hexyl acrylate, nonyl acrylate, lauryl acrylate, methyl methacrylate, ethyl methacrylate, propyl methacrylate, isopropyl methacrylate, butyl methacrylate, pentyl methacrylate, hexyl methacrylate, 2-ethyl hexyl methacrylate, nonyl methacrylate, lauryl methacrylate and the like. Isobornyl methacrylate and isobornyl acrylate monomers can be used. Cycloaliphatic acrylates methacrylates can be used such as trimethylcyclohexyl acrylate, t-butyl cyclohexyl acrylate, cyclohexyl methacrylate, isobornyl methacrylate, 2-ethylhexyl methacrylate, and the like. Aryl acrylates and methacrylates such as benzyl acrylate and benzyl methacrylate also can be used.

Ethylenically unsaturated monomers containing hydroxy functionality include hydroxy alkyl acrylates and hydroxy alkyl methacrylates, wherein the alkyl group has 1 to 4 carbon atoms can be used. Suitable monomers include hydroxy ethyl acrylate, hydroxy propyl acrylate, hydroxy isopropyl acrylate, hydroxy butyl acrylate, hydroxy ethyl methacrylate, hydroxy propyl methacrylate, hydroxy isopropyl methacrylate, hydroxy butyl methacrylate, and the like, and mixtures thereof. Hydroxy functionality may also be obtained from monomer precursors, for example, the epoxy group of a glycidyl methacrylate unit in a polymer. Such an epoxy group may be converted, in a post polymerization reaction with water or a small amount of acid, to a hydroxy group.

Suitable other olefinically unsaturated comonomers that can be used include: acrylamide and methacrylamide and derivatives as alkoxy methyl (meth) acrylamide monomers, such as methacrylamide, N-isobutoxymethyl methacrylamide, and N-methylol methacrylamide; maleic, itaconic and fumaric anhydride and its half and diesters; vinyl aromatics such as styrene, alpha methyl styrene and vinyl toluene; and polyethylene glycol monoacrylates and monomethacrylates.

Other functional monomers such as itaconic or maleic anhydride, the half ester thereof, acrylonitrile, allyl methacrylate, aceto acetoxyethyl methacrylate, methylacryl amidoglycolate methyl ether, ethylene urea ethyl methacrylate, 2- acrylamide-2 methyl propane sulfonic acid, trialkoxy silyl ethyl methacrylate, reaction products of mono epoxy esters or mono epoxy ethers with alpha-beta unsaturated acids and reaction products of glycidyl (meth) acrylate with mono functional acids up to 22 carbon atoms can be used.

In the synthesis of the macromonomer and/or the acrylic polymer small amounts of difunctional alpha-beta unsaturated compounds can be used as, e.g., ethylene glycol dimethacrylate or hexane diol diacrylate.

The stabilizer components formed from the macromonomers or the core or both of the acrylic polymer contain at least 3% and up to 30% by weight, based on the weight of the acrylic polymer, of polymerized ethylenically unsaturated monomers containing functional groups which will react with the polyisocyanate crosslinking agent. Any of the aforementioned reactive monomers can be used such as hydroxy ethyl acrylate, hydroxy ethyl methacrylate; and the like and other monomers such as acrylamide, nitro phenol acrylate, nitro phenol methacrylate, phthalimido methyl acrylate, phthalimido methacrylate, acryloamido propane sulfonic acid, and mixtures thereof Polymerizable acid functional monomers can be used such as acrylic acid, methacrylic acid, maleic acid, itaconic acid and the like. Methacrylic and acrylic acid are preferred. Other acids that can be used are ethylenically unsaturated sulfonic, sulfinic, phosphoric or phosphonic acid and esters thereof; typically, styrene sulfonic acid, acrylamido methyl propane sulfonic acid, vinyl phosphonic or phosphoric acid and its esters and the like, also can be used.

The core of the acrylic polymer is a gelled structure. In one preferred embodiments, the acrylic polymer contains overall (including both core and macromonomer stabilizer components) about 5 to 40, parts by weight of hydroxy functional acrylic monomers as, e.g., 2-hydroxyethyl acrylate, 2-hydroxyethyl methacrylate, 2-hydroxypropyl acrylate, 2-hydroxypropyl methacrylate, 2- hydroxybutyl acrylate, 4-hydroxybutyl acrylate and the like. These hydroxy groups can be used for crosslinking with the polyisocyanate crosslinking agent in addition to the any other reactive groups that may be on the acrylic polymers.

Particularly useful acrylic polymers include the following:

an acrylic polymer having a core of polymerized acrylate or methacrylate monomers, styrene monomers, methacrylic or acrylic acid monomers, and hydroxy-functional acrylate or methacrylate monomers, glycidyl methacrylate or acrylate monomers and stabilizing polymeric components of a macromonomer having a weight average molecular weight of about 500–10,000 and containing polymerized alkyl methacrylate or acrylate monomers and about 3–30% by weight, based on the weight of the macromonomer, of glycidyl methacrylate or glycidyl acrylate;

an acrylic polymer having a core of polymerized monomers of styrene, hydroxy ethyl acrylate, methyl methacrylate, glycidyl methacrylate, allyl methacrylate and methyl acrylate and stabilizing polymeric components of a macromonomer of butyl methacrylate and glycidyl methacrylate; and an acrylic polymer having a core of polymerized monomers of methyl methacrylate, glycidyl methacrylate, methacrylic acid, methyl acrylate and stabilizing polymeric components of a macromonomer of styrene, butyl methacrylate, butyl acrylate, hydroxy ethyl acrylate, methacrylic acid, isobornyl methacrylate and glycidyl methacrylate.

The coating composition of this invention formed with the above described acrylic polymer dispersion contains a polyisocyante crosslinking agent.

Any of the conventional aromatic, aliphatic, cycloaliphatic, isocyanates, trifunctional isocyanates and isocyanate functional adducts of a polyol and a diisocyanate can be used. Typically useful diisocyanates are 1,6-hexamethylene diisocyanate, isophorone diisocyanate, 4,4'-biphenylene diisocyanate, toluene diisocyanate, bis cyclohexyl diisocyanate, tetramethylene xylene diisocyanate, ethyl ethylene diisocyanate, 2,3-dimethyl ethylene diisocyanate, 1-methyltrimethylene diisocyanate, 1,3-cyclopenthylene diisocyanate, 1,4-cyclohexylene diisocyanate, 1,3- phenylene diisocyanante, 1,5-naphthalene diisocyanate, bis-(4-isocyanatocyclohexyl)- methane, diisocyanatodiphenyl ether and the like.

Typical trifunctional isocyanates that can be used are triphenylmethane triisocyanate, 1,3,5-benzene triisocyanate, 2,4,6-toluene triisocyanate and the like.

Trimers of diisocyanates also can be used such as the trimer of hexamethylene diisocyanate which is sold under the tradename Desmodur® N-3390.

Isocyanate functional adducts can be used that are formed from an organic polyisocyanate and a polyol. Any of the aforementioned polyisocyanates can be used with a polyol to form an adduct. Polyols such as trimethylol alkanes like trimethylol propane or ethane can be used. One useful adduct is the reaction product of tetramethylxylidene diisocyanate and trimtheylol propane and is sold under the tradename of Cythane® 3160.

Blocked polyisocyanates also can be used. Typical blocking agents are alcohols, ketimines, oximes and the like.

About 0–70% by weight, preferably 1–40% by weight, based on the weight of the binder, of an oligomer having a weight average molecular weight of about 200–2,000 and a polydispersity of less than 1.7 and having functional components capable of reaction with the polyisocyanate crosslinking agent can be used in the novel composition.

Typically useful oligomers include caprolactone oligomers which may be made by reacting caprolactone with a cyclic polyol. Particularly useful caprolactone oligomers are described on col. 4., line 3- col. 5, line 2 of U.S. Pat. No. 5,286,782. Other useful oligomers are polyester oligomers such as an oligomer of an alkylene glycol, like propylene glycol, an alkane diol, like hexane diol, and an anhydride like methyl hexahydrophthalic anhydride reacted to a low acid number. Another useful oligomer is an acid functional oligomer such as an oligomer of a polyol such as pentaerythritol reacted with an anhydride such as methyl hexahydrophthalic anhydride to an acid number of about 30–300, preferably 150–250. Other useful oligomers are hydroxy functional and are formed by reacting 1,2 epoxy butane with the above described acid functional oligomers using triethyl amine as a reaction catalyst resulting in very low (less than 20) acid number oligomers. Compatible mixtures of any of the aforementioned oligomers also can be used.

The coating compositions of the present invention can also contain up to 40% of total binder of an acrylic polymer or polyester having a weight average molecular weight greater than 2,000 for improved appearance, sag resistance, flow and leveling and such. The acrylic polymer can be composed of typical monomers such as acrylates, methacrylates, styrene and the like and functional monomers such as hydroxy ethyl acrylate, glycidyl methacrylate, or gamma methacryly propyl trimethoxy silane and the like. Conventional polyesters can be used such as SCD® - 1040 from Etna Products Inc.

To improve weatherability of the clear composition about 0. 1–10% by weight, based on the weight of the binder, of ultraviolet light stabilizers screeners, quenchers and antioxidants can be added. Typical ultraviolet light screeners and stabilizers include the following:

Benzophenones such as hydroxy dodecycloxy benzophenone, 2,4-dihydroxy benzophenone, hydroxy benzophenones containing sulfonic acid groups and the like.

Benzoates such as dibenzoate of diphenylol propane, tertiary butyl benzoate of diphenylol propane and the like.

Triazines such as 3,5-dialkyl-4-hydroxyphenyl derivatives of triazine, sulfur containing derivatives of dialkyl4-hydroxy phenyl triazine, hydroxy phenyl- 1,3,5-triazine and the like.

Triazoles such as 2-phenyl-4-(2,2'-dihydroxy benzoyl)-triazole, substituted benzotriazoles such as hydroxy-phenyltriazole and the like.

Hindered amines such as bis(1,2,2,6,6-pentamethyl4-piperidinyl sebacate), di[4(2,2,6,6-tetremethylpiperidinyl)] sebacate and the like and any mixtures of any of the above.

The coating composition contains sufficient amount of a catalyst to cure the composition at ambient temperatures. Generally, about 0.01–2% by weight, based on the weight of the binder, of catalyst is used. Typically useful catalysts are triethylene diamine and alkyl tin laurates such as dibutyl tin dilaurate, dibutyl tin diacetate, tertiary amines and the like.

Generally, flow control agents are used in the composition in amounts of about 0.1–5% by weight, based on the weight of the binder, such as polyacrylic acid, polyalkylacrylates, polyether modified dimethyl polysiloxane copolymer and polyester modified polydimethyl siloxane.

When used as a clear coating, it may be desirable to use pigments in the coating composition which have the same refractive index as the dried coating. Typically, useful pigments have a particle size of about 0.015–50 microns and are used in a pigment to binder weight ratio of about 1:100 to 10:100 and are inorganic siliceous pigments such as silica pigment having a refractive index of about 1.4–1.6.

In the application of the coating composition as a clear coating to a vehicle such as an automobile or a truck, the basecoat which may be either a solvent based composition or a waterborne composition is first applied and then dried to at least remove solvent or water before the clear coating is applied usually by conventional spraying. Electrostatic spraying may also be used. The dry film thickness of the clear coating is about 0.5–5 mils. The clear coating is dried at ambient temperatures generally in less than 5 minutes to a tack and dust free state. Moderately higher temperatures up to about 40° C. also can be used. As soon as the clear coating is sufficiently cured to be dust free and tack free the vehicle can be moved from the work area to allow for the refinishing of another vehicle.

Generally, within about 3 hours after application, the clear coating is sufficiently cured to allow for buffing and polishing if needed to remove imperfections and improve gloss of the finish. The clear coating continues to cure and after 7–10 days reaches a relatively high level of hardness and toughness that is required for a durable and weatherable automotive finish.

The coating composition of this invention can also be pigmented and used as a base coat in a clear coat/color coat finish or as a monocoat. Typical pigments that are used in such a coating composition are metallic oxides such as titanium dioxide, iron oxides of various colors, zinc oxide, carbon black, filler pigments such as talc, china clay, barytes, carbonates, silicates and a wide variety of organic colored pigments such as quinacridones, copper phthalocyanines, perylenes, azo pigments, indanthrone blues, carbazoles such as carbazole violet, isoindolinones, isoindolones, thioindigo reds, benzimilazolinones, and metallic flake pigments such as aluminum flake, nickel flake and the like.

Coating compositions of this invention have excellent adhesion to a variety of metallic or non-metallic substrates, such as previously painted substrates, cold rolled steel, phosphatized steel, and steel coated with conventional primers by electrodeposition. These coating composition can be used to coat plastic substrates such as polyester reinforced fiberglass, reaction injection-molded urethanes and partially crystalline polyamides.

Coating compositions of this invention can be applied by conventional techniques such as spraying, electrostatic spraying, dipping, brushing, flowcoating and the like. The preferred techniques are spraying and electrostatic spraying. In refinish applications, the composition is dried and cured at ambient temperatures but can be forced dried at elevated temperatures of 40°–100° C. for about 5–30 minutes. For OEM applications, the composition is typically baked at 100°–150° C. for about 15–30 minutes to form a coating about 0.1–3.0 mils thick. When the composition is used as a clearcoat, it is applied over the color coat which may be dried to a tack-free state and cured or preferably flash dried for a short period before the clearcoat is applied. The color coat/clearcoat finish is then baked as mentioned above to provide a dried and cured finish. The present invention is also applicable to non-baking refinish systems, as will be readily appreciated by those skilled in the art.

It is customary to apply a clear topcoat over a basecoat by means of a "wet-on-wet" application, i.e., the topcoat is applied to the basecoat without curing or completely drying the basecoat. The coated substrate is then heated for a predetermined time period to allow simultaneous curing of the base and clear coats.

The following Examples illustrate the invention. All parts and percentages are on a weight basis unless otherwise indicated. All molecular weights disclosed herein are determined by GPC (gel permeation chromatography) using a polystyrene standard.

EXAMPLE 1

Preparation of a Macromonomer Composition

To a 2-liter flask fitted with an agitator, condenser, heating mantle, nitrogen inlet, thermocouple and an addition port was added 325.2 grams butyl methyacrylate, 81.3 grams glycidyl methacrylate, 100 grams butyl acetate and 160 gms toluene. The mixture was agitated and heated to reflux (122°–135° C.) under nitrogen. To this was then added, as a shot, a pre-mixed solution of 0.35 grams Vazo® 88, 13.8 grams toluene and 17.2 grams of a 0.17% solution of bis(boron difluoro diphenyl glyoximate) cobaltate(II) in methyl ethyl ketone. This was immediately followed by the addition of a pre-mixed soution of 285.4 grams butyl methacrylate, 71.3 grams glycidyl methacrylate, 1.35 grams Vazo® 88 and 86.6 grams toluene over 240 minutes while maintaining refulx (116°–122° C.). Following a 30 minute hold period, a pre-mixed solution of 0.32 grams Vazo® 88 and 23 grams toluene was added over 60 minutes while maintaining reflux (116°–122° C.). Following a 30 minute hold period, a pre-mixed solution of 0.32 grams Vazo® 88 and 23 grams toluene was added over 60 minutes while maintaining refulx. The batch was then held at reflux for an additional 60 minutes at which time a solution of 0.23 grams t-butyl peroctoate and 31.39 grams butyl acetate was added and the reaction mixture was then cooled. The macromonomer thus prepared has a was then added over 300 minutes while maintaining reflux.

The resulting composition has a weight solids of 62.7% and Gardner viscosity Q.

Preparation of Non-Aqueous Dispersion

To a 2-liter flask fitted with an agitator, condenser, heating mantle, nitrogen inlet, thermocouple and an addition port was added 236.4 grams of the macromonomer composition prepared above, 301.9 grams heptane and 75.5 grams ethyl acetate. This mixture was agitated and heated to reflux (90° to 93° C.) under nitrogen. A solution of 0.75 t-butyl peroctoate in 41.9 grams heptane was then added as a shot. This was immediately followed by the addition of a pre-mixed solution of 62.9 grams styrene, 92.3 grams hydroxy ethyl acrylate, 100.7 grams methyl methacrylate, 83.7 grams glycidyl methacrylate, 4.2 grams allyl methacrylate, 75.5 grams methyl acrylate, 41.9 grams toluene, 25.8 grams heptane and 6.3 grams t-butyl peroctoate over 210 minutes maintaining reflux. The batch was then held at reflux for 60 minutes after which a pre-mixed solution of 21.4 grams toluene, 8.4 grams heptane and 4.2 grams t-butyl peroctoate was added over 30 minutes and the batch then held at reflux for 60 minutes. This was followed by distillation of 83.9 grams solvent and the batch then cooled to room temperature. The resulting composition has a percent weight solids of 52.6, viscosity 1400 centipoise at 50 rmp Brookfield and particle size 240 nanometers as measured by Coulter quasi-elastic light scattering and the polymer has a calculated Tg of 41° C.

EXAMPLE 2

Preparation of Dispersant Polymer

To a 5-liter flask fitted with an agitaor, condenser, heating mantle, nitrogen inlet, thermocouple and an addition port was added 893.6 grams xylene and the temperature raised to reflux (135°–140° C.) under nitrogen. A pre-mixed solution of 477.3 grams styrene, 492.6 grams butyl methacrylate, 483.9 grams butyl acrylate, 263.9 grams hydroxy ethly acrylate, 49.0 grams methacrylic acid, 327.2 grams isobornyl methacrylate, 127.1 grams t-butyl peracetate and 336.4 grams xylene were then added over 240 minutes while maintaining reflux temperature. The reaction mixture was then held at reflux for 30 minutes This was followed by the addition, in order, of a solution of 0.08 grams catechol in 0.89 grams isopropanol, 37.2 grams glycidyl methacrylate and 0.5 grams of 2-methyl, 2-N,N-dimethylamino propanol. The reaction mixture was held at reflux for 120 minutes and then cooled. The resulting percent weight solids were 63.6, Gardner viscosity T, number avearage molecular weight 3270 and weight average molecular weight 7740.

Preparation of Non-Aqueous Dispersion Polymer

To a 2-liter flask fitted with an agitator, condenser, heating mantle, nitogen inlet, thermocouple and an addition port was added 256.3 grams of dispersant polymer prepared above, 30.6 grams isopropanol 8.6 gm. ethyl acetate, 70.6 grams mineral spirits and 151.3 grams heptane. This mixture was agitated and heated to reflux (90°–93° C.) under nitrogen at which time a pre-mixed solution of 0.65 grams t-butyl peroctoate and 7.6 grams heptane was added as a shot. This was immediately followed by the addition of a pre-mixed solution of 64.6 grams styrene, 86.0 grams hydroxy ethylacrylate, 159.9 grams methyl methacrylate, 6.5 grams glycidyl methacrylate, 17.2 grams methacrylic acid, 75.5 grams methyl acrylate, 19.5 grams ethyl acetate, 38.4 grams heptane, 39.4 grams mineral spirits, 128.7 grams of dispersant polymer prepared above and 6.5 grams t-butyl peroctoate over 210 minutes maintaining the batch at reflux. The batch was then held at reflux for 45 minutes after which a pre-mixed solution of 18.5 grams butyl acetate and 2.1 grams t-butyl peroctoate was added over 30 minutes and the batch then held at reflux for 60 minutes. This was followed by the distillation of 82.5 grams solvent after which the batch was cooled to room temperature. The resulting composition has percent weight solids of 60.8, viscosity 440 centipoise at 5 rpm Brookfield and particle size 317 nanometers as measured by Coulter quasi-elastic light scattering and the polymer had a calculated Tg of 41° C.

EXAMPLE 3

A coating composition was prepared by charging the following constituents into a mixing vessel:

| PART 1 | PARTS BY WEIGHT |
|---|---|
| Non aqueous Dispersion (prepared in Example 2) | 89.88 |
| Butyl Acetate | 19.04 |
| Tinuvin ® 384 (UV Screener from Ciba-Geigy) | 2.19 |
| BYK ® 306 (Flow additive from Byk Chemie) | 0.28 |
| Tinuvin ® 292 (Light Stabilizer from Ciba-Geigy) bis(n-methyl-2,2,6,6-tetramethyl piperidinyl)sebacate | 1.39 |
| 1% dibutyl tin dilaurate in methyl ethyl ketone | 2.43 |
| PART 2 | |
| Tolonate HDT-LV (Isocyanate trimer from Rhone-Poulenc) | 10.95 |
| Butyl Acetate | 3.85 |
| Total | 130.01 |

The constituents of part 1 were charged into the mixing vessel in the order shown with mixing and then the consitituents of Part 2 were added with mixing and the composition was thoroughly mixed to form a coating composition.

A coating was cast (at approximately 2 mils dry film) on glass and cured at room temperature. The potlife (as measured by Zahn 2 paint cup), of this composition was very good. The coating composition had a 4 second rise in viscosity in 3 hours. The coating had very fast physical dry time (when cotton lightly placed on coating will not stick) with good 24 hour hardness and final cure hardness and cure properties.

EXAMPLE 4

A coating composition was prepared by charging the following constituents into a mixing vessel:

| PART 1 | PARTS BY WEIGHT |
| --- | --- |
| Non aqueous Dispersion (prepared in Example 1) | 87.87 |
| Butyl Acetate | 6.15 |
| Tinuvin ® 384 (described in Example 3) | 2.26 |
| BYK ® 306 (described in Example 3) | 0.29 |
| Tinuvin ® 292 (described in Example 3) | 1.43 |
| 1% dibutyl tin dilaurate in methyl ethyl ketone | 2.51 |
| PART 2 | |
| Tolonate HDT-LV (Isocyanate trimer) | 21.82 |
| Total | 122.33 |

The constituents of Part 1 were charged into the mixing vessel in the order shown and mixed and then Part 2 was added and thoroughly mixed to form a coating composition.

A coating was cast (at approximately 2 mils dry film) on glass and cured at room temperature. The coating had good early cure and good final film properties.

EXAMPLE 5

A tetra hydroxy oligomer was prepared as follows:

To a 12-liter flask fitted with an agitator, condense, heating mantle, nitrogen inlet, thermocouple and an addition port was added 2447.2 grams propylene glycol monomethylether acetate, 792.4 grams pentaerythritol and 1.36 grams triethyl amine. The reaction mixture was agitated and heated to 140° C. under a nitrogen blanket at which time 3759 grams of methyl hexahydrophthalic anhydride was added over 6 hours. The reaction mixture was then held at 140° C. until no anhydride bands were observed on an infrared spectroscopic trace. An acid oligomer was formed.

To a 5-liter flask fitted with an agitator, condense, heating mantle, nitrogen inlet, thermocouple and an addition port was added 2798.4 grams of acid oligomer prepared above and 2.76 grams triethyl amine. The mixture was agitated and heated to 60° C. under nitrogen. 696.9 grams of 1,2-epoxy butane was then added over 120 minutes after which the temperature was raised to 105° C. and held at that temperature until the acid number dropped to about 10 or less. The percent weight solids of the composition was 71.5, Gardner viscosity V, and the oligomer has a number average molecular weight 895 and weight average molecular weight 1022.

Oligomer A was prepared as follows:

To a 12-liter flask fitted with an agitator, condenser, heating mantle, nitrogen inlet, thermocouple and an addition port was added 2434.5 grams propylene glycol monomethylether acetate, 1222.5 grams hexane diol and 1.37 grams triethyl amine. The reaction mixture was agitated and heated to 140° C. under a nitrogen blanket at which time 3341.6 grams of methyl hexahydrophthalic anhydride was added over 6 hours. The reaction mixture was then held at 140° C. until no anhydride bands were observed on an infrared spectroscopic trace. An acid oligomer was formed.

To a 5-liter flask equipped as above, the following constituents were added: 2020.4 grams of acid oligomer prepared above and 2.45 grams triethyl amine.

The mixture was agitated and heated to 60° C. under nitrogen. 478.3 grams 1,2-epoxy butane was then added over 120 minutes after which the temperature was raised to 105° C. and held at that temperature until the acid number dropped to about 10 or less. The resulting composition has a percent weight solids of 69.5, Gardner viscosity A, number average molecular weight 679 and weight average molecular weight 770.

A coating composition was prepared by charging the following ingredients into a mixed vessel:

| PART 1 | PARTS BY WEIGHT |
| --- | --- |
| Tetra hydroxy functional oligomer (Prepared above) | 14.61 |
| Oligomer A (Prepared above) | 11.34 |
| 1% Dibutyl tin dilaurate in methyl ethyl ketone | 0.74 |
| 10% BYK ® 301 (Silicone flow control additive from BYK Chemie in propylene glycol monomethyl ether acetate) | 0.37 |
| Non aqueous dispersion (prepared in Example 1) | 10.35 |
| PART 2 | |
| Tolonate HDT-LV (Isocyanate trimer) | 12.58 |
| Total | 49.99 |

The constituents of Part 1 were charged into the mixing vessel in the order shown and mixed a nd then Part 2 was added and thoroughly mixed to form a coating composition.

A coating was cast (film build of approximately 2 mils) on uniprime coated panel and cured at room temperature. The coating had good early cure and final film properties.

EXAMPLE 6

A coating composition was prepared charging the following constituents into a mixing vessel:

| PART 1 | PARTS BY WEIGHT |
| --- | --- |
| Tetra hydroxy functional oligomer (Prepared in Example 5) | 14.5 |
| Oligomer A (Prepared in Example 5) | 11.15 |
| Butyl acetate | 9.23 |
| 1% Dibutyl tin dilaurate in methyl ethyl ketone | 0.76 |
| 10% BYK ® 301 (described in Example 5) | 0.38 |
| Non aqueous dispersion (prepared in Example 2) | 10.15 |
| PART 2 | |
| Tolonate HDT-LV (Isocyanate trimer) | 13.82 |
| Total | 59.99 |

The constituents of Part 1 were charged into the mixing vessel in the order shown and thoroughly mixed and then Part 2 was added and mixed to form a coating compostion.

A coating was cast (film buid of approximately 2 mils) on a uniprime coated panel and cured at room temperature. The coating had good early and final film properties. The same clear made without the non aqueous dispersion had a longer time to physically dry (29 minutes longer) and through dry (29 minutes longer in BK surface dry time), and had a lower final hardness.

The coating composition of this Example (applied as above) was also cured for 30 minutes @60° C. and gave excellent etch resistance, hardness and cure.

An improvement in 1.5 units in resistance to 10% sulfuric acid (for 30 minutes @15° C. and 22° C.) was noted versus the same clear without non aqueous disperision (rating =14.5 versus 13 on a scale of 0–20 where 20 is the best rating).

Various modifications, alterations, additions or substitutions of the components of the compositions of this invention will be apparent to those skilled in the art without departing from the scope and spirit of this invention. This invention is not limited to the illustrative embodiments set forth herein, but rather the invention is defined by the following claims.

We claim:

1. A coating composition comprising about 40–90% by weight of film forming binder and 10–60% by weight of an organic liquid carrier; wherein the binder comprises about (a) 10–90% by weight, based on the weight of the binder, of a dispersed gelled acrylic polymer having a glass transition temperature of at least 20° C. the polymer consisting essentially of (i) 30–70% by weight based on the weight of the polymer, of a core comprising polymerized ethylenically unsaturated monomers which is not soluble in the organic liquid carrier and having chemically grafted thereto (ii) 70–30% by weight based on the weight of the polymer of substantially linear stabilizer polymeric components that are soluble in the organic liquid carrier comprising polymerized ethylenically unsaturated monomers and having a weight average molecular weight of about 500–20,000 determined by GPC (gel permeation chromatography) using polystyrene as the standard and having a glass transition temperature of 20°–80° C.;

wherein the monomers of the core and the stabilizer polymeric components are individually selected from the group consisting of alkyl methacrylates, alkyl acrylates, wherein the alkyl groups have 1–12 carbon atoms, hydroxy alkyl methacrylate, hydroxy alkyl acrylates, wherein the alkyl groups have 1–4 carbons atoms, styrene, alpha methyl styrene, vinyl toluene, glycidyl methacrylate, glycidyl acrylate, isobrnyl methacrylate, isobrnyl acrylate, alpha-beta ethylenically unsaturated monocarboxylic acids and any mixtures thereof and the core, stabilizer polymeric components or both contain at least 3% by weight of polymerized ethylenically unsaturated monomers selected from the above group having functional components that are capable of reacting with component (c) and optionally with component (b);

(b) 0–70% by weight, based on the weight of the binder, of an oligomer having functional components capable of reacting with component (c); and (c) 10–50% by weight, based on the weight of the binder, of an organic polyisocyanate crosslinking agent.

2. The coating composition of claim 1 wherein the linear stabilizer polymeric components consist of macromonomers that are polymerized into the core via a single terminal point of ethylenic unsaturation of the macromonomer and the monomers that form the macromonomer are polymerized in the pressence of a cobalt chain transfer agent to provide the single point of ethylenic unsaturation.

3. The coating composition of claim 1 containing 1–40% by weight, based on the weight of the binder, of an oligomer having a weight average molecular weight of 200–2,000 and a polydispersity of less than 1.7 and having functional components capable of reacting with the polyisocyanate crosslinking agent of the composition.

4. The coating composition of claim 3 in which the oligomer is a polyester oligomer.

5. The coating composition of claim 3 in which the oligomer is a caprolactone oligomer.

6. The coating composition of claim 3 in which the oligomer is a hydroxy functional oligomer.

7. The coating composition of claim 3 in which the oligomer is an acid functional oligomer.

8. The coating composition of claim 3 containing a polyester oligomer and a hydroxy functional oligomer.

9. The coating composition of claim 1 wherein the core of the dispersed gelled acrylic polymer consists of polymerized monomers of styrene, hydroxy ethyl acrylate, methyl methacrylate, glycidyl methacrylate, allyl methacrylate and methyl acrylate and the linear stabilizer components of the dispersed gelled acrylic polymer consisting of polymerized monomers of butyl methacrylate and glycidyl methacrylate.

10. The coating composition of claim 1 wherein the core of the dispersed gelled acrylic polymer consists of polymerized monomers of methyl methacrylate, glycidyl methacrylate, methacrylic acid, methyl acrylate and the linear stabilizer components of the dispersed acrylic polymer consist of polymerized monomers of styrene, butyl methacrylate, butyl acrylate, hydroxy ethyl acrylate, methacrylic acid, isobornyl methacrylate and glycidyl methacrylate.

11. The coating composition of claim 1 which contains up to 40 percent by weight of total binder of a acrylic polymer or polyester with weight average molecular weight of greater than 2,000.

12. A substrate coated with a dried cured layer of the coating composition of claim 1.

* * * * *